(12) United States Patent
Kroker et al.

(10) Patent No.: US 7,122,583 B2
(45) Date of Patent: *Oct. 17, 2006

(54) COLD-BOX BINDERS CONTAINING AN EPOXY RESIN, ACRYLATE, AND CERTAIN AKYL ESTERS

(75) Inventors: Jorg Kroker, Powell, OH (US); H. Randall Shriver, Columbus, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/627,470

(22) Filed: Jul. 25, 2003

(65) Prior Publication Data

US 2005/0020724 A1    Jan. 27, 2005

(51) Int. Cl.
*B22C 1/22* (2006.01)
(52) U.S. Cl. ............ 523/147; 523/139; 523/145; 524/270; 524/272; 164/75
(58) Field of Classification Search ............. 523/139, 523/145, 147, 436; 524/270, 272
See application file for complete search history.

(56) References Cited

U.S. PATENT DOCUMENTS

| 4,518,723 | A | 5/1985 | Woodson | 523/466 |
|---|---|---|---|---|
| 4,526,219 | A | 7/1985 | Dunnavant et al. | 164/16 |
| 4,806,576 | A | 2/1989 | Woodson | 523/139 |
| 6,136,888 | A | 10/2000 | Torbus et al. | 523/142 |
| 6,465,542 | B1 | 10/2002 | Torbus et al. | 523/143 |
| 6,604,567 | B1 * | 8/2003 | Woodson et al. | 164/75 |
| 2005/0020725 | A1 * | 1/2005 | Wang et al. | 523/139 |
| 2005/0020726 | A1 * | 1/2005 | Shriver | 523/139 |
| 2005/0020727 | A1 * | 1/2005 | Shriver et al. | 523/139 |

FOREIGN PATENT DOCUMENTS

DE    19727540 A1    3/1998

OTHER PUBLICATIONS

Hawley's Condensed Chemical Dictionary, 2004.*
Aizpurua, B. J. Appl. Poly. Sci., vol. 76, 1269-1279 (2000).*

* cited by examiner

*Primary Examiner*—Vasu Jagannathan
*Assistant Examiner*—Vickey Ronesi
(74) *Attorney, Agent, or Firm*—David L. Hedden

(57) ABSTRACT

This invention relates to foundry binder systems, which will cure in the presence of sulfur dioxide and a free radical initiator, comprising (a) an epoxy resin; (b) an acrylate; (c) an alkyl ester of a fatty acid, wherein the alkyl group of the ester is an aliphatic hydrocarbon having from 4 to 8 carbon atoms, preferably butyl tallate; and (d) an effective amount of a free radical initiator. The foundry binder systems are used for making foundry mixes. The foundry mixes are used to make foundry shapes (such as cores and molds) which are used to make metal castings, particularly ferrous castings.

10 Claims, No Drawings

COLD-BOX BINDERS CONTAINING AN EPOXY RESIN, ACRYLATE, AND CERTAIN AKYL ESTERS

FIELD OF THE INVENTION

This invention relates to foundry binder systems, which will cure in the presence of sulfur dioxide and a free radical initiator, comprising (a) an epoxy resin; (b) an acrylate; (c) an alkyl ester of a fatty acid, wherein the alkyl group of the ester is an aliphatic hydrocarbon having from 4 to 8 carbon atoms, preferably butyl tallate; and (d) an effective amount of a free radical initiator. The foundry binder systems are used for making foundry mixes. The foundry mixes are used to make foundry shapes (such as cores and molds) which are used to make metal castings, particularly ferrous castings.

DESCRIPTION OF THE RELATED ART

In the foundry industry, one of the procedures used for making metal parts is "sand casting". In sand casting, disposable molds and cores are fabricated with a mixture of sand and an organic or inorganic binder. The foundry shapes are arranged in core/mold assembly, which results in a cavity into which molten metal will be poured. After the molten metal is poured into the assembly of molds and cores and cools, the metal part formed by the process is removed from the assembly. The binder is needed so the molds and cores will not disintegrate when they come into contact with the molten metal.

Two of the prominent fabrication processes used in sand casting are the no-bake and the cold-box processes. In the no-bake process, a liquid curing catalyst is mixed with an aggregate and binder to form a foundry mix before shaping the mixture in a pattern. The foundry mix is shaped by placing it into a pattern and allowing it to cure until it is self-supporting and can be handled. In the cold-box process, a gaseous curing catalyst is passed through a shaped mixture (usually in a corebox) of the aggregate and binder to cure the mixture.

A cold-box process widely used in the foundry industry for making cores and molds is the "$SO_2$ cured epoxy/acrylate system". In this process, a mixture of a hydroperoxide (usually cumene hydroperoxide), an epoxy resin, a multifunctional acrylate, typically a coupling agent, and optional diluents, are mixed into an aggregate (sand) and compacted into a specific shape, typically a core or mold. Sulfur dioxide ($SO_2$), optionally diluted with nitrogen or another inert gas, is blown into the binder/aggregate shape. The shape is instantaneously hardened and can be used immediately in a foundry core/mold system.

German Patent Application DE 197 27 540 discloses examples of epoxy-acrylic foundry binders containing methyl-, ethyl- and propyl-esters of oleic acid, which are cured with sulfur dioxide in the presence of a free radical initiator.

BRIEF SUMMARY OF THE INVENTION

The subject invention relates to foundry binder systems, which cure in the presence of gaseous sulfur dioxide and a free radical initiator, comprising:
(a) 20 to 70 parts by weight of an epoxy resin;
(b) 1 to 50 parts by weight of an acrylate;
(c) 1 to 30 parts by weight of an alkyl ester of a fatty acid, wherein the alkyl group of the ester is an aliphatic hydrocarbon having from 4 to 8 carbon atoms, preferably butyl tallate; and
(d) an effective amount of a hydroperoxide, where (a), (b), (c), and (d) are separate components or mixed with another of said components, provided (b) is not mixed with (d), and where said parts by weight are based upon 100 parts of binder.

It has been found that addition of an alkyl ester of a fatty acid to the binder system, wherein the alkyl group of the ester is an aliphatic hydrocarbon having from 4 to 8 carbon atoms, improves the tensile strength development and humidity resistance of cores and molds made with these binders. Preferably used as the epoxy resin is an epoxy resin derived from bisphenol A.

The foundry binders are used for making foundry mixes. The foundry mixes are used to make foundry shapes, such as cores and molds, which are used to make metal castings.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed. All percentages are percentages by weight unless otherwise specified.

An epoxy resin is a resin having an epoxide group, i.e.,

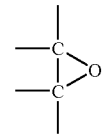

such that the epoxide functionality of the epoxy resin (epoxide groups per molecule) is equal to or greater than 1.9, typically from 2.0 to 4.0.

Examples of epoxy resins include (1) diglycidyl ethers of bisphenol A, B, F, G and H, (2) halogen-substituted aliphatic epoxides and diglycidyl ethers of other bisphenol compounds such as bisphenol A, B, F, G, and H, and (3) epoxy novolacs, which are glycidyl ethers of phenolic-aldehyde novolacs, (4) cycloaliphatic epoxy reins, and (5) mixtures thereof.

Epoxy resins (1) are made by reacting epichlorohydrin with the bisphenol compound in the presence of an alkaline catalyst. By controlling the operating conditions and varying the ratio of epichlorohydrin to bisphenol compound, products of different molecular weight can be made. Epoxy resins of the type described above based on various bisphenols are available from a wide variety of commercial sources.

Examples of epoxy resins (2) include halogen-substituted aliphatic epoxides, diglycidyl ethers of other bisphenol compounds such as bisphenol A, B, F, G, and H, and epoxy novolac resins. Examples of halogen-substituted aliphatic epoxides include epichlorohydrin, 4-chloro-1,2-epoxybutane, 5-bromo-1,2-epoxypentane, 6-chloro-1,3-epoxyhexane and the like.

Examples of epoxy novolacs (3) include epoxy cresol and epoxy phenol novolacs, which are produced by reacting a novolac resin (usually formed by the reaction of orthocresol or phenol and formaldehyde) with epichlorohydrin, 4-chloro-1,2-epoxybutane, 5-bromo-1,2-epoxypentane, 6-chloro-1,3-epoxyhexane and the like.

Examples of cycloaliphatic epoxy resins include any aliphatic, cycloaliphatic, or mixed aliphatic-cycloaliphatic epoxide having any aliphatic groups, and further includes aliphatic epoxy resins having aromatic groups, i.e. mixed aliphatic-aromatic epoxy resins. The aliphatic epoxy resin may contain monomeric epoxide compounds in admixture with polymeric epoxide compounds. The most preferred aliphatic epoxy resins are represented by the following structural formulae:

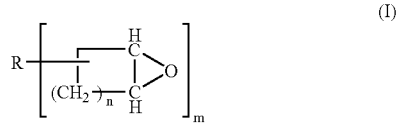
(I)

where "n"$\geq$1 and "m" is a whole number, typically from 1 to 4, preferably from 2–3, or

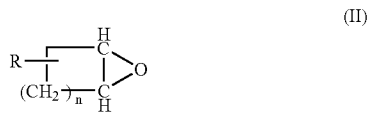
(II)

where "n"$\geq$1.

R in structures I and II is predominantly aliphatic in nature, but may contain oxygen functionality as well as mixed aliphatic-aromatic groups. Typically, R is selected from the group consisting of alkyl groups, cycloalkyl groups, mixed alkyl-cycloaliphatic groups, and substituted alkyl groups, cycloalkyl groups, or alkyl-cycloaliphatic groups, where the substituents include, for example, ether, carbonyl, and carboxyl groups.

Specific examples of aliphatic epoxy resins include 3,4-epoxycyclohexylmethyl-3,4-epoxycyclohexane carboxylate; vinylcyclohexene dioxide; 2-(3,4-epoxycyclohexyl-5,5-spiro-3,4-epoxy) cyclohexane-meta-dioxane; bis-(3,4-epoxycyclohexyl)adipate; 1,2-epoxy-p-vinylcycloyhexene; limonene monoxide; limonene dioxide; and hydrogenated bisphenol diglycidyl ethers Preferably used are epoxy resins having an average epoxide functionality of at least 2.1 to 3.5, preferably from about 2.3 to about 3.0. Particularly preferred are epoxy resins having an average weight per epoxy group of 165 to 200 grams/equivalent.

The acrylate is a reactive acrylic monomer, polymer, or mixture thereof and contains ethylenically unsaturated bonds. Examples of such materials include a variety of monofunctional, difunctional, trifunctional, tetrafunctional and pentafunctional monomeric acrylates and methacrylates. A representative listing of these monomers includes alkyl acrylates, acrylated epoxy resins, cyanoalkyl acrylates, alkyl methacrylates, cyanoalkyl methacrylates, and difunctional monomeric acrylates. Other acrylates, which can be used, include trimethylolpropane triacrylate, pentaerythritol tetraacrylate, methacrylic acid and 2-ethylhexyl methacrylate. Typical reactive unsaturated acrylic polymers, which may also be used, include epoxy/acrylate reaction products, polyester/urethane/acrylate reaction products, acrylated urethane oligomers, polyether acrylates, polyester acrylates, and acrylated epoxy resins.

Examples of alkyl esters of a fatty acid, wherein the alkyl group of the ester is an aliphatic hydrocarbon having from 4 to 8 carbon atoms, include butyl tallate, isooctyl tallate, isobutylsoyate, and butyl oleate. Preferably used as the alkyl ester of a fatty acid is butyl tallate.

The free radical initiator is a peroxide and/or hydroperoxide. Examples include ketone peroxides, peroxy ester free radical initiators, alkyl oxides, chlorates, perchlorates, and perbenzoates. Preferably, however, the free radical initiator is a hydroperoxide or a mixture of peroxide and hydroperoxide. Hydroperoxides particularly preferred in the invention include t-butyl hydroperoxide, cumene hydroperoxide, paramenthane hydroperoxide, etc. The organic peroxides may be aromatic or alkyl peroxides.

Examples of useful diacyl peroxides include benzoyl peroxide, lauroyl peroxide and decanoyl peroxide. Examples of mixed aromatic-aliphatic and aliphatic peroxides respectively include dicumyl peroxide and di-t-butyl peroxide.

Cumene hydroperoxide and/or a multifunctional acrylate, such as trimethylolpropane triacrylate, may be added to the epoxy resin before mixing it with the foundry aggregate.

Although solvents are not required for the reactive diluent, they may be used to reduce binder system viscosity or impart other properties to the binder system, such as humidity resistance. Typical solvents used are generally polar solvents, such as liquid dialkyl esters, e.g. dialkyl phthalate of the type disclosed in U.S. Pat. No. 3,905,934, and other dialkyl esters such as dimethyl glutarate, dimethyl succinate, dimethyl adipate, and mixtures thereof. Suitable aromatic solvents are benzene, toluene, xylene, ethylbenzene, alkylated biphenyls and naphthalenes, and mixtures thereof. Preferred aromatic solvents are mixed solvents that have an aromatic content of at least 90% and a boiling point range of 138° C. to 232° C. Suitable aliphatic solvents include kerosene. Reactive epoxy resin diluents, such as glycidyl ether, may also be used. If a solvent is used, sufficient solvent should be used so that the resulting viscosity of the epoxy resin component is less than 1,000 centipoise, preferably less than 400 centipoise. Generally, however, the total amount of solvent is used in an amount of 0 to 25 weight percent based upon the total weight of the epoxy resin.

The binder may also contain a silane coupling agent having the following general formula:

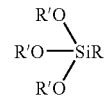

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The silane is preferably added to the Part II binder component in amounts of 0.01 to 2 weight percent, preferably 0.1 to 0.5 weight percent based on the weight of the Part II binder component.

Polyols may also be used in the foundry binder, e.g. phenolic resins, polyester polyols, and polyether polyols. Of particular interest are phenolic resole resins known as benzylic ether phenolic resole resins, including alkoxy-modifed benzylic ether phenolic resole resins and alkoxylated versions thereof, which are well known in the art, and are specifically described in U.S. Pat. Nos. 3,485,797 and 4,546,124.

It will be apparent to those skilled in the art that other additives such as silicones, release agents, defoamers, wetting agents, etc. can be added to the aggregate, or foundry mix. The particular additives chosen will depend upon the specific purposes of the formulator.

Typically, the amounts of the components used in the binder system are from 20 to 70 parts by weight of epoxy resin, preferably from 40 to 65 parts by weight; 1 to 50 parts by weight of multifunctional acrylate, preferably from 5 to 30 parts by weight; from 1 to 30 parts of the ester of fatty acid, and preferably from 5 to 25 parts by weight; from 10 to 25 parts by weight of free radical initiator, preferably from 15 to 20 parts by weight, where the parts by weight are based upon 100 parts of the binder system.

Although the components can be added to the foundry aggregate separately, it is preferable to package the epoxy resin and free radical initiator as a Part I and add to the foundry aggregate first. Then the ethylenically unsaturated material, as the Part II, either alone or along with some of the epoxy resin, is added to the foundry aggregate.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used are known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sands, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

The foundry mix is molded into the desired shape by ramming, blowing, or other known foundry core and mold making methods. The shape is then cured almost instantaneously by the cold-box process, using vaporized sulfur dioxide as the curing agent (most typically a blend of nitrogen, as a carrier, and sulfur dioxide containing from 35 weight percent to 65 weight percent sulfur dioxide), described in U.S. Pat. Nos. 4,526,219 and 4,518,723, which are hereby incorporated by reference. The shaped article is preferably exposed to effective catalytic amounts of gaseous sulfur dioxide, and, optionally, minor amounts of a carrier gas can be used. The exposure time of the sand mix to the gas is typically from 0.5 to 10 seconds. The foundry shape is cured after gassing with sulfur dioxide. Oven drying is needed if the foundry shape is coated with a refractory coating.

The core and/or mold may be formed into an assembly. When making castings, the assembly may be coated with a water-based refractory coating and passed through a conventional or microwave oven to remove the water from the coating.

Abbreviations

The abbreviations used in the examples are as follows:

| | |
|---|---|
| Bis-A epoxy | bisphenol-A epoxy resin, having a functionality of 1.9, an epoxide equivalent weight of about 184–192 g/eq, and a viscosity of about 13,000 cp. |
| BT | butyl ester of tall oil fatty acid, PLASTHALL 503 from CP Hall. |
| CHP | cumene hydroperoxide. |
| ISOSET® 4304 (Part I) | acrylate-free epoxy resin component containing bis A epoxy resin and CHP in a weight ratio of about 65 to 35 |
| ISOSET® 4305 NS (Part II) | epoxy resin component containing bis A epoxy resin, TMPTA and a silane coupling agent, such that the amount of epoxy resin is about 55 weight percent and the amount of TMPTA is about 45 weight percent. |
| ISOSET® 4315 (Part II) | epoxy resin component containing bis A epoxy resin, TMPTA, a dibasic ester solvent, an aliphatic solvent, and a silane coupling agent, such that the amount of epoxy resin is about 40 weight percent and the amount of TMPTA is about 25 weight percent. |
| ISOSET® 4525 (Part II) | epoxy resin component containing bis A epoxy resin, TMPTA, a dibasic ester solvent, and an aliphatic solvent, such that the amount of epoxy resin is about 50 weight percent and the amount of TMPTA is about 40 weight percent. |
| MS | methyl ester of soybean oil, ME-130 sold by Lambent Technologies. |
| OT | isooctyltallate, PLASTHALL 100 sold by CP Hall. |
| RME | rapeseed methyl ester, Connester 6020 sold by OELMUEHLE LEER of Germany. |

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application, all units are in the metric system and all amounts and percentages are by weight, unless otherwise expressly indicated.

Testing Protocol

The binder formulations were evaluated in the following examples for their tensile strengths. ISOSET®4304/4525 binder, which did not contain an ester of a fatty acid, was used as the control. BT and OT were added to the Part I to see what effect the addition had on the binder and cores made from the binder. Comparison examples were carried out using methyl esters of fatty acids, e.g. RME or MS instead of BT and OT. In the formulations containing the ester of the fatty acid in the Part I, 25 percent by weight of the fatty acid ester was used based upon the total weight of the Part I, unless otherwise indicated.

The components were mixed for 4 minutes using a Hobart sand mixer. The binders were prepared and all cores were made on a Gaylord MTB-3 core-blowing unit. SO$_2$ cured tensile test specimens were gassed 0.50 seconds with a 65/35 SO$_2$/nitrogen mixture delivered by an MT Systems SO$_2$/Nitrogen blending unit followed by a 10 second dry air purge. The binder level was 1.0% based on the weight of the sand.

Measurement of Tensile Strength

How well a binder system bonds an aggregate (sand) together is typically evaluated by comparing tensile strength measurements of test cores made with the binder. Sufficient core strength is needed once the binder/sand mix is cured to prevent the core from distorting or cracking during assembly operations. Tensile strength measurements are taken immediately (20 seconds after core box opens), 5-minutes, one-hour, 24-hours and 24 hours at 90% relative humidity. Binder systems that retain higher tensile strengths over time can better retain their dimensional accuracy and have less core breakage problems. All tensile strength measurements were measured in accordance with standard ASTM tests.

A description of the formulations used and the resulting tensile strengths of test cores made with the binder are set forth in Tables I, II, and III.

TABLE I

Control A
Examples 1 & 2
Comparative Examples B & C

|  | | Examples | | Comp. Examples | |
| --- | --- | --- | --- | --- | --- |
|  | Control A | 1 | 2 | B | C |
| Part I | ISOSET 4304 | +25% BT | +25% OT | +25% RME | +25% MS |
| Part II | ISOSET 4305 NS | 4305 NS | 4305 NS | 4305 NS | 4305 NS |
| Part I/II | 60/40 | 60/40 | 60/40 | 60/40 | 60/40 |
| Tensile Strength [psi] | | | | | |
| 1mm | 77 | 86 | 104 | 72 | 63 |
| 5 Min | 138 | 156 | 172 | 124 | 122 |
| 1 h | 179 | 198 | 198 | 159 | 154 |
| 24 h | 185 | 241 | 232 | 198 | 181 |
| 24 h/90% rh | 136 | 183 | 184 | 145 | 128 |

TABLE II

Control D
Examples 3 & 4
Comparative Examples E & F

|  | | Examples | | Comp. Examples | |
| --- | --- | --- | --- | --- | --- |
|  | Control D | 3 | 4 | E | F |
| Part I | ISOSET 4304 | +25% BT | +25% OT | +25% RME | +25% MS |
| Part II | ISOSET 4315 | 4315 | 4315 | 4315 | 4315 |
| Part I/II | 60/40 | 60/40 | 60/40 | 60/40 | 60/40 |
| Tensile Strength [psi] | | | | | |
| 1mm | 60 | 71 | 77 | 48 | 59 |
| 5 Min | 104 | 134 | 140 | 85 | 122 |
| 1 h | 140 | 180 | 175 | 111 | 153 |
| 24 h | 191 | 228 | 219 | 144 | 187 |
| 24 h/90% rh | 142 | 182 | 174 | 144 | 148 |

TABLE III

Control G
Examples 5 & 6
Comparative Examples H & I

|  | | Examples | | Comp. Examples | |
| --- | --- | --- | --- | --- | --- |
|  | Control G | 5 | 6 | H | I |
| Part I | ISOSET 4304 | +25% BT | +25% OT | +25% RME | +25% MS |
| Part II | ISOSET 4525 | 4525 | 4525 | 4525 | 4525 |
| Part I/II | 60/40 | 60/40 | 60/40 | 60/40 | 60/40 |
| Tensile Strength [psi] | | | | | |
| 1mm | 70 | 78 | 90 | 63 | 58 |
| 5 Min | 128 | 141 | 151 | 116 | 109 |
| 1 h | 158 | 173 | 183 | 148 | 125 |
| 24 h | 179 | 220 | 225 | 190 | 163 |
| 24 h/90% rh | 129 | 176 | 174 | 140 | 126 |

The data in Tables I–III indicate that the formulations with BT and OT provide higher over all tensile strengths than the control and similar formulations using RME and MS.

We claim:

1. A foundry binder system, which cures in the presence of sulfur dioxide and a free radical initiator, comprising:
   (a) 20 to 70 parts by weight of an epoxy resin;
   (b) 1 to 50 parts by weight of an acrylate;
   (c) 1 to 30 parts by weight of butyl tallate; and
   (d) from 10 to 25 parts by weight of a peroxide,
wherein (a), (b), and (c) are separate components or mixed with another of said components, provided (b) is not mixed with (d), and where said parts by weight are based upon 100 parts by weight of the binder system.

2. The binder system of claim 1 wherein the epoxy resin comprises an epoxy resin derived from bisphenol A.

3. The binder system of claim 2 wherein the epoxy resin has an epoxide equivalent weight of 165 to 200 grams per equivalent.

4. The binder system of claim 3 wherein the acrylate is a monomer.

5. The binder system of claim 4 wherein the acrylate is trimethyolpropane triacrylate and the peroxide is a hydroperoxide.

6. The binder system of claim 5 wherein the hydroperoxide is cumene hydroperoxide.

7. The foundry binder system of claim 6 wherein the amount of epoxy 40 to 65 parts by weight; the amount of acrylate is from 5 to 30 parts by weight; the amount of butyl tallate is from 5 to 25 parts by weight; and the amount of peroxide is from 15 to 20 parts by weight.

8. A foundry mix comprising:
   (a) a major amount of foundry aggregate;
   (b) an effective bonding amount of the foundry binder system of claim 1, 2, 3, 4, 5, 6, or 7.

9. A cold-box process for preparing a foundry shape comprising:
   (a) introducing the foundry mix of claim 8 into a pattern; and
   (b) curing with gaseous sulfur dioxide.

10. A foundry shape prepared in accordance with claim 9.

* * * * *